United States Patent
Gao et al.

(10) Patent No.: US 9,600,254 B1
(45) Date of Patent: Mar. 21, 2017

(54) LOOP BRANCH REDUCTION

(71) Applicant: International Business Machines Corporation, Armonk, NY (US)

(72) Inventors: Yaoqing Gao, North York (CA); Archana Ravindar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,688

(22) Filed: Nov. 30, 2015

(51) Int. Cl.
  *G06F 9/44* (2006.01)
  *G06F 9/45* (2006.01)
  *G06F 9/30* (2006.01)

(52) U.S. Cl.
  CPC .......... *G06F 8/452* (2013.01); *G06F 9/30058* (2013.01)

(58) Field of Classification Search
  None
  See application file for complete search history.

(56) References Cited

U.S. PATENT DOCUMENTS

| 7,890,943 | B2 | 2/2011 | Guo et al. |
| 8,087,012 | B2 | 12/2011 | Chan |
| 8,745,607 | B2 | 6/2014 | Valluri et al. |
| 2009/0055815 | A1* | 2/2009 | Chan ........................ G06F 8/443 717/160 |

OTHER PUBLICATIONS

Bienia, et al., "The PARSEC Benchmark Suite: Characterization and Architectural Implications", Princeton University Technical Report TR-811-08, Jan. 2008. 22 pages.

Bodik, "Compiler Construction", 14th International Conference, CC 2005. Held as Part of the Joint European Conferences on Theory and Practice of Software, ETAPS 2005. Edinburgh, UK, Apr. 4-8, 2005. Library of Congress Control No. 2005922868. © Springer-Verlag Berlin Heidelberg 2005. 315 pages.

Hughes, et al., "Computer Graphics: Principles and Practice", Third Edition. ISBN-13: 978-0-321-39952-6. First printing, Jul. 2013. Copyright © 2014 Pearson Education, Inc. 184 pages.

Mell, et al., "The NIST Definition of Cloud Computing", Recommendations of the National Institute of Standards and Technology, Special Publication 800-145, Sep. 2011. 7 pages.

* cited by examiner

*Primary Examiner* — Qamrun Nahar
(74) *Attorney, Agent, or Firm* — Gregory M. Nordstrom

(57) ABSTRACT

A method for reducing loop branches comprises analyzing an intermediate code to identify a candidate loop; analyzing the candidate loop to identify a candidate conditional statement containing at least one mutable operand; and determining if the computation in the candidate conditional statement is monotonic. The method further comprises calculating initial and final values of the mutable operand and generating a first version of the candidate loop which does not contain the candidate conditional statement and which is configured to be executed if the initial and final values of the mutable operand satisfy a range check. The method also comprises generating a second version of the candidate loop which contains the candidate conditional statement and which is configured to be executed if at least one of the initial and final values of the mutable operand does not satisfy the range check.

18 Claims, 4 Drawing Sheets

LOOP BRANCH REDUCTION

BACKGROUND

Some programs contain code which will be executed only under specific conditions depending on factors which often cannot be determined beforehand. In addition, some modern processors implement instruction pipelining. Such processors work on a pipeline model which is fed with a stream of instructions obtained by the instruction fetch unit that has to look at multiple instructions beyond the current instruction to keep the pipeline fed continuously so that multiple functional units are busy executing instructions.

When there are branches in the instruction stream, the next instruction to be fetched can be either the target instruction, if the branch is taken, or the next instruction in sequence following the branch, if the branch is not taken. This can introduce a bubble in the pipeline as it typically takes multiple cycles for a branch to be resolved and fetch the "right" next instruction.

SUMMARY

Aspects of the disclosure provide a method, system, and computer program product for reducing loop branches is provided. In one embodiment, the method comprises analyzing an intermediate code corresponding to source code to be compiled to identify a candidate loop which satisfies one or more predetermined conditions; analyzing the candidate loop to identify a candidate conditional statement containing at least one mutable operand; and analyzing a portion of the intermediate code which computes respective values of the mutable operand in the candidate conditional statement in iterations of the loop to determine if the computation in the candidate conditional statement is monotonic. The method further comprises calculating an initial value of the mutable operand and a final value of the mutable operand in response to determining that the computation in the candidate conditional statement is monotonic and generating a first version of the candidate loop which does not contain the candidate conditional statement and which is configured to be executed if the initial value of the mutable operand and the final value of the mutable operand satisfy a range check. The method also comprises generating a second version of the candidate loop which contains the candidate conditional statement and which is configured to be executed if at least one of the initial value of the mutable operand or the final value of the mutable operand does not satisfy the range check.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
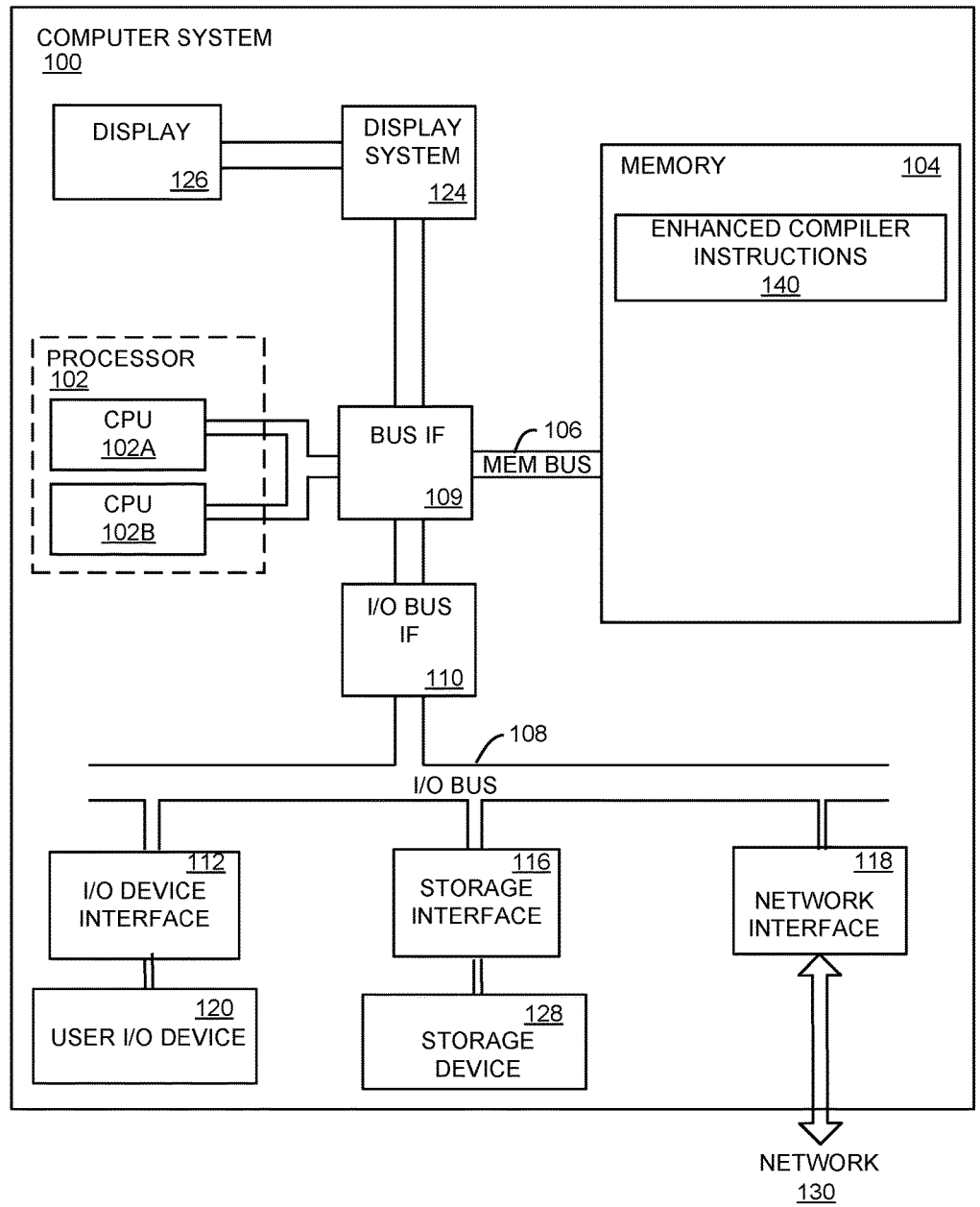
FIG. 1 is a high-level block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a high-level block diagram of one embodiment of an example computer system 100. The components of the computer system 100 shown in FIG. 1 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 1, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, in this embodiment, the memory 104 stores enhanced compiler instructions 140 which is described in more detail below. In some embodiments, the memory 104 represents the entire virtual memory of the computer system 100, and may also include the virtual memory of other computer systems coupled directly to the computer system 100 or connected via a network 130. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example. Hence, although the enhanced compiler instructions 140 are stored on memory 104 in the example shown in FIG. 1 for purposes of explanation, it is to be understood that other embodiments can be implemented differently. For example, the enhanced compiler instructions can be distributed across multiple physical media.

Furthermore, in some embodiments, the enhanced compiler instructions 140 are executed by the same processor 102. However, in other embodiments, execution of the enhanced compiler instructions 140 is distributed across multiple processors located in the same or different computer systems. For example, in some such embodiments, at least a portion of the instructions and data structures associated with the enhanced compiler instructions 140 can be on different computer systems and accessed remotely, e.g., via a network 130. The computer system 100 can use virtual addressing mechanisms that allow the programs of the computer system 100 to behave as if they only have access to a large, single storage entity instead of access to multiple, smaller storage entities. Thus, the memory 104 can store all or a portion of the various programs, modules, and data structures for reducing loop branches as discussed herein.

The computer system 100 in the embodiment shown in FIG. 1 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units. In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or another other displayable device. In some embodiments, the display device 126 also includes one or more speakers for rendering audio. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112 supports the attachment of one or more user I/O devices 120, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 120, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, or any other suitable type of electronic device. In addition, in some embodiments, the computer system 100 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Some example cloud computing embodiments are discussed in more detail below. It is to be understood that although this disclosure includes a detailed description on cloud computing, implementation of the embodiments recited herein are not limited to a cloud computing environment.

As discussed above, in some embodiments, one or more of the components and data shown in FIG. 1 include instructions or statements that execute on the processor 102 or instructions or statements that are interpreted by instructions or statements that execute the processor 102 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system.

The computer system 100 is configured to identify, analyze and improve branches in loop nests. In particular, the computer system 100 is configured to reduce the number of branches that are likely to be executed within a given loop by modifying the code to move branches outside of a loop when specific conditions are met, as described in more detail herein. In particular, in the example of FIG. 1, the computer system 100 is configured to target conditional statements, such as "if" conditions, within a loop that contain variables that can be modified in every iteration. Specifically, the computer system 100 is configured to reduce branches for conditional statements which include variables that follow a deterministic and monotonic pattern, as described in more detail below. The computer system 100 can also apply the techniques described herein for cases where the conditional statement has variables that are invariant in addition to variables displaying monotonic values.

By identifying and modifying such loops, the computer system 100 is able to improve performance of the code when executed. In addition to improving performance, another advantage of moving the branches out of the loop includes opening up opportunities for the computer system 100 to carry out Single-Instruction, Multiple-Data (SIMD) instructions for the loop. SIMD instructions are similar instructions that work on multiple data appropriate for simple math sequences.

Such instructions can often be seen, for example, in image processing code. For example, some code patterns in image processing applications, such as code patterns which work with images in different dimensions, transform an image from one dimension to the other, or check for points lying within an image frame, involve a number of boundary checks to ascertain if the image is visible or not. As mentioned above, one advantage of the techniques discussed herein is that it reduces the number of branches within the loop rendering a straight line code sequence to a pipeline resulting in faster execution. This improvement also enables more compiler improvement opportunities, e.g. SIMDization. However, it is to be understood that the embodiments described herein are not limited to image processing code. In particular, other types of code which can benefit from the techniques described herein can include, but are not limited to, code for molecular dynamic models where the model variables are checked to determine if the variables fall within a particular range.

In operation, the computer system 100 receives an input source code, such as via the network interface 118 or the I/O interface 112. The enhanced compiler instructions 140 are configured to cause the processor 102 to compile the input source code. The enhanced compiler instructions 140 can be implemented as a just-in-time compiler or as an ahead-of-time compiler. In addition, the enhanced compiler instructions 140 are configured to cause the processor 102 to identify loops having conditional statements, such as an "if" condition, within the loop. Conditional statements are instructions whose execution or operation is dependent on the value of one or more variables, as understood by one of skill in the art. In addition, loops can be identified using techniques known to one of skill in the art such as through identifying backward branches in the code which signal loops or through identifying patterns known to be indicative of loops, for example.

The enhanced compiler instructions 140 are further configured to cause the processor 102 to determine if the variables operated on by the conditional statement change deterministically and monotonically. As used herein, "deterministic variables" or variables that change deterministically are variables whose values change according to well-defined mathematical equations and are not random. In addition, as used herein, "monotonic variables" or variables which change monotonically are variables whose values either continue increasing or continue decreasing with each iteration. The enhanced compiler instructions 140 can be configured, in some embodiments, to cause the processor 102 to identify the variables being operated on and the values the variables are compared with and to implement the variables in an algorithm check to determine if the variables are changing deterministically and monotonically.

If the variables are changing deterministically and monotonically, the enhanced compiler instructions 140 are further configured to cause the processor 102 to modify the input code to include two versions of the loop. In particular, one version of the loop, also referred to as the fast version, moves the conditional statement outside of the loop, as described in more detail below. The other version is a duplicate of the original version of the loop, also referred to herein as the slow version. Thus, the enhanced compiler instructions 140 enables moving conditional statements which have variables that are modified in each iteration outside the loop. Conventional systems do not address or modify conditional statements which have variables that are modified in each iteration of the loop. The embodiments described herein can also be applied to invariant variables along with variables displaying monotonic values.

For example, the following example code transforms a series of sampled x and y coordinates taken within an image and performs boundary check on the sampled coordinates.

```
for(i=initial; i<final; i=f(i)) {
    x=math_function(p1.x, delta, s1.x);
    y=math_function(p1.y, delta, s1.y);
    if(x>=0 && x<EdgeMap.MaxWidth( ) && y>=0 &&
        y<EdgeMap.Height) {// code
    }
}// end image processing loop
```

It is to be understood that the above example code is provided for purposes of explanation only and is not intended to be limiting in scope. In the above example code, p1.x, p1.y, s1.x, and s1.y, are the x and y co-ordinate values of several points within the image; delta is a constant; math_function is a monotonically increasing or decreasing function; and x and y are temporary variables used for computation within the loop. The term "code" in the above example is a generic placeholder referring to code which is executed based on the results of the boundary check performed in the "if" statement.

Conventional compilers do not move if conditions, like the one in the example code above, which have mutable variables that can be transformed or modified in every iteration. For example, in the code example above, the variables x and y are transformed in each iteration by the math_function as shown. However, the enhanced compiler instructions 140 are configured to leverage determinations that the variables x and y are transformed deterministically and that math_function is either monotonically increasing or decreasing. For example, in the illustrative code above, x and y are functions of fixed points p1.x, p1.y, s1.x, and s1.y that do not change every iteration and delta is a constant. Thus, x and y are transformed deterministically and in a controlled manner in the example above.

Based on the above determinations, the enhanced compiler instructions 140 are configured to cause the processor 102 to modify the code to include two versions of the loop. In particular, the enhanced compiler instructions 140 generate a fast version which determines the initial and final values of the changing variables (e.g. x and y in the example code). If both the initial and final values of the changing variables (e.g. x and y) satisfy a boundary condition, then all intermediate values also satisfy the boundary condition since the variables change deterministically and monotonically. Boundary condition checks (also known as bounds checking) includes any technique for detecting whether a value of a variable is within a known bound or limit, as known to one of skill in the art. Hence, the enhanced compiler instructions 140 cause the processor 102 to perform the boundary condition check on the initial and final values of the changing variables. If the initial and final values satisfy the boundary condition check, then the fast version of the loop is executed which avoids making the boundary check in every iteration of the loop. If one or both of the initial and final values do not satisfy the boundary check conditions, then the slower loop is executed which is equivalent to the original loop and performs the boundary check in every iteration of the loop. An example of code containing the two versions for the example loop above is shown below:

```
x_initial=compute_initial_math_function(p1.x, delta, s1.x);
x_final=compute_final_math_function(p1.x, delta, s1.x);
y_initial=compute_initial_math_function(p1.y, delta, s1.y);
y_final=compute_final_math_function(p1.y, delta, s1.y);
if(x_initial>=0 && x_initial <EdgeMap.MaxWidth( ) &&
  x_final >=0 && x_final <EdgeMap.MaxWidth( ) && y_initial >=0 && y_initial<EdgeMap.Height( ) && y_final >=0
  && y_final<EdgeMap.Height( ) {
    for(i=initial; i<final; i=f(i)) {
      x=math_function(p1.x, delta, s1.x);
      y=math_function(p1.y, delta, s1.y);
      // code
    } // end fast version of loop
  }
  else {
    for(i=initial; i<final; i=f(i)) {
      x=math_function(p1.x, delta, s1.x);
      y=math_function(p1.y, delta, s1.y);
      if(x>=0 && x<EdgeMap.MaxWidth( ) && y>=0 &&
        y<EdgeMap.Height( ) {// code
      }
  } // end slow version of loop
}
```

In the above example modified code, x_initial and y_initial are initial values of x and y. Similarly, x_final and y_final are final values of x and y. As can be seen in the example modified code, the original loop has been replaced with two versions of the loop. In the fast version of the loop, the "if" condition is not part of the loop. Hence, the number of branches in the loop has been reduced, as described above. The slow version of the loop, however, is equivalent to the original version of the loop having the "if" condition boundary check within the loop. Thus, if the boundary check is satisfied for the initial and final values of the variables, an improvement in performance can be achieved, as discussed above. However, if the boundary check is not satisfied for the initial and final values of the variables, the performance is similar to that of the original loop.

Figure 2:
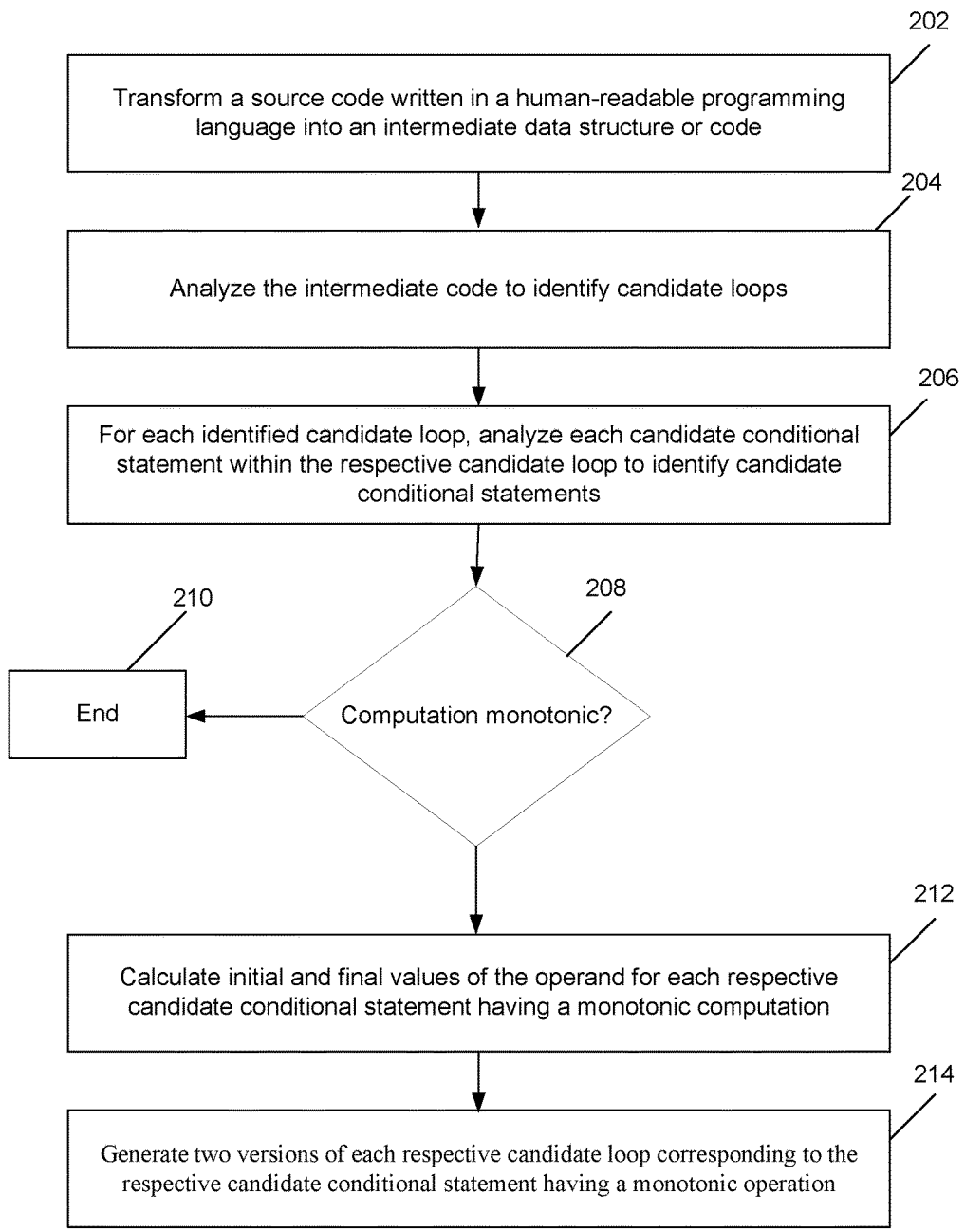
FIG. 2 is a flow chart depicting one embodiment of a method for assisting code review.

FIG. 2 is a flow chart depicting one embodiment of an example method 200 for reducing loop branches. The method 200 can be implemented by a computer system, such as computer system 100 discussed above, to reduce loop branches by moving "if" conditions from loops. In this embodiment, at block 202, the computer system transforms a source code written in a human-readable programming language into an intermediate data structure or code which enables control flow and data flow analysis. Transformation of source code to an intermediate code is understood by one of skill in the art and not discussed in greater detail herein. Indeed, as understood by one of skill in the art, intermediate code is a data structure constructed from the source code and from which the machine code or actual processing unit instructions of the compiled code are generated. It is to be understood that, in other embodiments, the process of transforming the source code to intermediate code is performed by a separate system and provided to the computer system as intermediate code for analysis.

At block 204, the computer system analyzes the intermediate code corresponding to the input source code to be compiled to identify candidate loops. In some embodiments, the computer system analyzes each loop in the input code to determine if each loop is a candidate loop. In addition, a loop can be a loop nest which contains one or more additional loops nested within the loop. In some embodiments, all loops within a given loop nest are analyzed without early exits from the loop nest. A candidate loop, as used herein, is a loop having loop bounds which are invariant and containing at least one conditional statement (e.g. an "if" condition, as discussed above). At block 206, for each identified candidate loop, the computer system analyzes each conditional statement within the respective candidate loop to identify candidate conditional statements. A candidate conditional statement, as used herein, is a conditional statement in which each operand (e.g. variable operated on by a mathematical operation) in the conditional statement is not aliased with any other variables and pointers within the loop. Thus, the optional analysis in block 206 helps identify conditional statements having operands/variables whose values can be reliably determined.

At block 208, for each candidate conditional statement, the computer system analyzes the intermediate code which computes each of the operands in the respective candidate conditional statement for each iteration of the loop. In particular, based on the analysis of the intermediate code, the computer system determines if the computation in the candidate conditional statement is monotonic. As stated above, a monotonic operation is an operation which produces a value that either continues to increase in each iteration or continues to decrease in each iteration. Stated another way, an operation is monotonic if its first derivative does not change sign from iteration to iteration.

For each candidate conditional statement which does not have a monotonic operation at block 208, the method 200 ends at block 210. For each candidate conditional statement which does have a monotonic operation, the method 200 continues at block 212 where the computer system calculates initial and final values of the operand for each respective candidate conditional statement having a monotonic computation by factoring in the number of times the loop is to be iterated. At block 214, the computer system versions each respective candidate loop corresponding to the respective candidate conditional statement having a monotonic operation. In particular, the computer system generates a first version of the loop which is under a runtime range check. That is, the first version of the loop does not contain conditional statements which can be evaluated at compile-time to satisfy the outermost range check (i.e. the initial and final values of the operand satisfy the range check.). The second version is equivalent to the original loop and is executed when the initial and final values of the operand does not satisfy the range check.

Hence, the method 200 can reduce the number of conditional statements (e.g. if conditions) within a loop. In particular, the method 200 can process conditional statements that contain mutable variables within the loop whereas conventional systems only address loop-invariant variables. As discussed above, the method 200 enables an enhanced compiler to compute the minimum and maximum values of a variable and create two versions of the loop such that the fast version, which does not contain the conditional statement (e.g. a boundary check), is entered if the variable(s) already satisfy the minimum and maximum condition so that the conditional statement is not executed unnecessarily for every iteration. The slow version is equivalent to the original version of the loop and include the conditional statement (e.g. boundary check) and is executed if the operand/variable does not satisfy the minimum and maximum boundary condition at the start of the loop.

It is to be understood that the order in which the blocks described below are discussed is not to be construed as limiting the order in which the individual acts can be performed. In particular, the acts performed can be performed simultaneously or in a different order than that discussed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
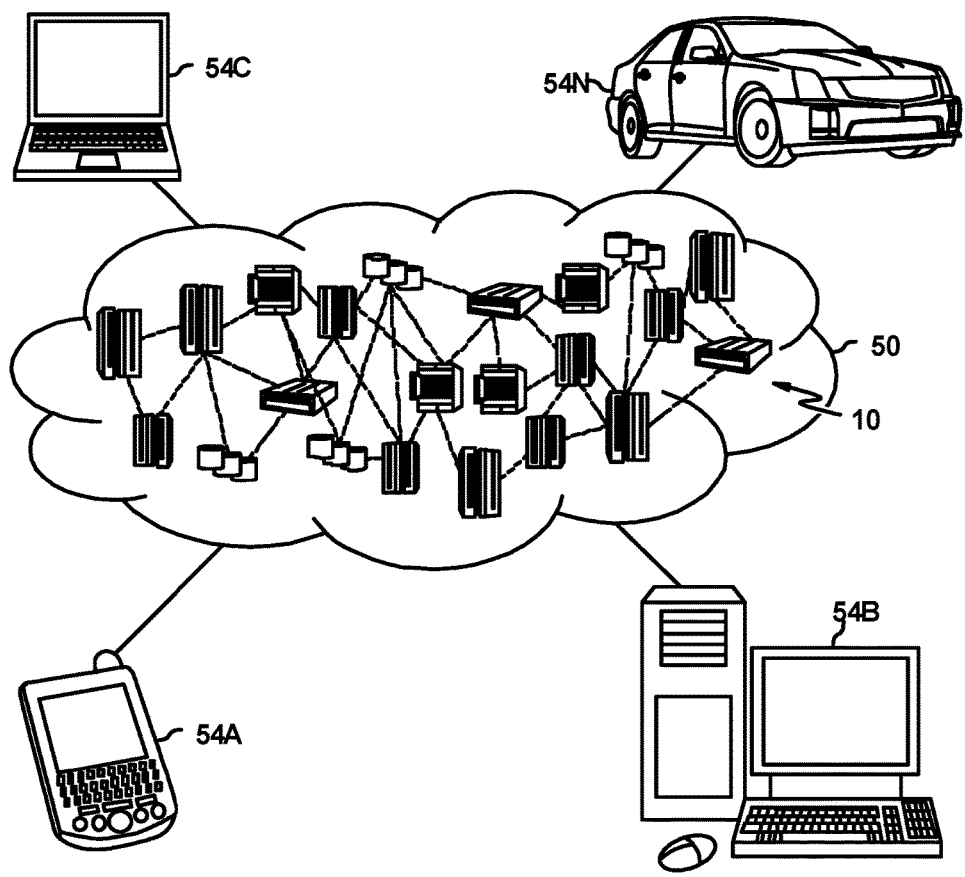
FIG. 3 depicts one embodiment of an example cloud computing environment.

Referring now to FIG. 3, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
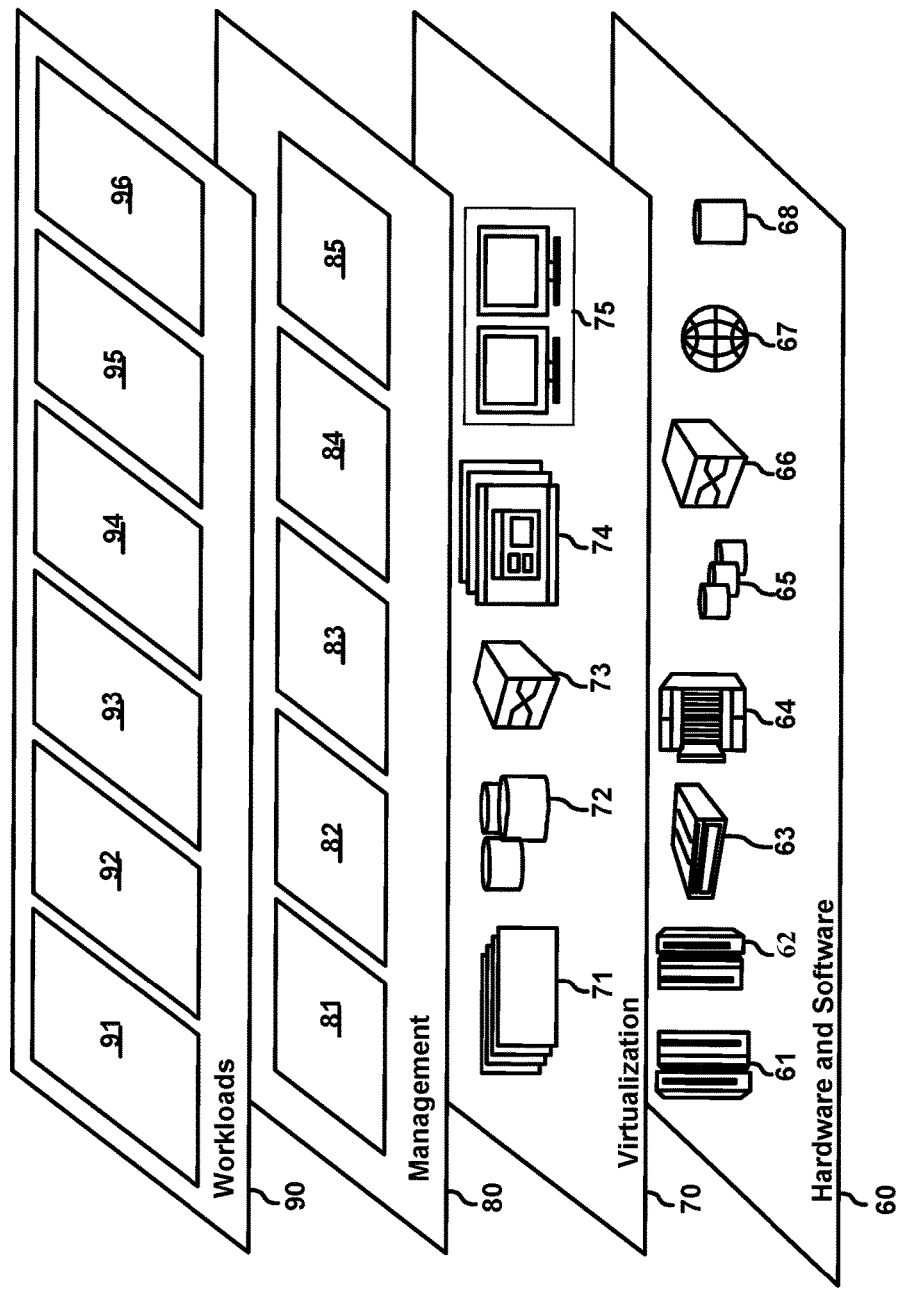
FIG. 4 depicts one embodiment of illustrative abstraction model layers.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced compiler processing 96. Enhanced compiler processing 96 is configured to perform one or more of the functions described above with respect to FIG. 1 and FIG. 2.

EXAMPLE EMBODIMENTS

Example 1 includes a computer-implemented method of reducing loop branches. The method comprises analyzing an intermediate code corresponding to source code to be compiled to identify a candidate loop which satisfies one or more predetermined conditions; analyzing the candidate loop to identify a candidate conditional statement containing at least one mutable operand; and analyzing a portion of the intermediate code which computes respective values of the mutable operand in the candidate conditional statement in iterations of the loop to determine if the computation in the candidate conditional statement is monotonic. The method also comprises calculating an initial value of the mutable operand and a final value of the mutable operand in response to determining that the computation in the candidate conditional statement is monotonic and generating a first version of the candidate loop which does not contain the candidate conditional statement and which is configured to be executed if the initial value of the mutable operand and the final value of the mutable operand satisfy a range check. The method also comprises generating a second version of the candidate loop which contains the candidate conditional statement and which is configured to be executed if at least one of the initial value of the mutable operand or the final value of the mutable operand does not satisfy the range check.

Example 2 includes the method of Example 1, wherein the computation in the candidate conditional statement includes the range check.

Example 3 includes the method of and of Examples 1-2, further comprising transforming the source code to the intermediate code prior to analyzing the intermediate code.

Example 4 includes the method of any of Examples 1-3, wherein the candidate loop is a loop nest containing one or more additional loops within the candidate loop; and wherein analyzing the candidate loop comprises analyzing each additional loop within the candidate loop without permitting early exit from the candidate loop.

Example 5 includes the method of any of Examples 1-4, wherein the candidate conditional statement includes at least one loop-invariant variable in addition to the at least one mutable operand.

Example 6 includes a computer system comprising an interface configured to receive input source code; and a processor coupled to the interface and configured to compile the input source code. The processor is further configured to modify a loop in the source code having a conditional statement within the loop, the conditional statement configured to operate on at least one mutable variable. To modify the loop, the processor is configured to move the conditional statement outside of the loop to generate a first version of the loop which is configured to be executed if an initial value of the at least one mutable variable and a final value of the at least one mutable variable each satisfy a boundary condition check. The processor is further configured to generate a second version of the loop containing the conditional statement within the second version of the loop, the second version of the loop configured to be executed if either the initial value of the at least one mutable variable or the final value of the at least one mutable variable does not satisfy the boundary check condition.

Example 7 includes the computer system of Example 6, wherein the processor is further configured to identify the loop to be modified by analyzing an intermediate code corresponding to the input source code and analyze a portion of the intermediate code which computes respective values of the mutable variable in the conditional statement in iterations of the loop to determine if the computation in the conditional statement is deterministic and monotonic. The processor is configured to generate the first and second versions of the loop in response to determining that the computation in the conditional statement is deterministic and monotonic.

Example 8 includes the computer system of Example 7, wherein the processor is further configured to transform the source code to the intermediate code prior to analyzing the intermediate code.

Example 9 includes the computer system of any of Examples 7-8, wherein the loop is a loop nest containing one or more additional loops within the loop; and wherein the processor is configured to analyze each additional loop within the loop without permitting early exit from the loop to identify the conditional statement configured to operate on at least one mutable variable.

Example 10 includes the computer system of any of Examples 6-9, wherein the interface is one of a network interface or an input/output interface.

Example 11 includes the computer system of any of Examples 6-10, wherein the conditional statement includes a boundary condition check computation.

Example 12 includes the computer system of any of Examples 6-11, wherein the processor is configured to implement one of a just-in-time compiler and an ahead-of-time compiler.

Example 13 includes the computer system of any of Examples 6-12, wherein the conditional statement includes at least one loop-invariant variable in addition to the at least one mutable variable.

Example 14 includes a program product comprising a processor-readable storage medium having program instructions embodied thereon. The program instructions are configured, when executed by at least one programmable processor, to cause the at least one programmable processor to identify a candidate loop; analyze the candidate loop to identify a candidate conditional statement containing at least one mutable variable; and analyze a computation of the candidate conditional statement which computes respective values of the mutable variable in iterations of the loop to determine if the computation in the candidate conditional statement is deterministic and monotonic. The program instructions are also configured to cause the at least one programmable processor to calculate an initial value of the mutable operand and a final value of the mutable operand in response to determining that the computation in the candidate conditional statement is deterministic and monotonic; generate a first version of the candidate loop which does not contain the candidate conditional statement and which is configured to be executed if the initial value of the mutable variable and the final value of the mutable variable satisfy a boundary condition check; and generate a second version of the candidate loop which contains the candidate conditional statement and which is configured to be executed if at least one of the initial value of the mutable variable or the final value of the mutable variable does not satisfy the boundary condition check.

Example 15 includes the program product of Example 14, wherein the computation in the candidate conditional statement includes the boundary condition check.

Example 16 includes the program product of any of Examples 14-15, wherein the program instructions are further configured to cause the at least one programmable processor to transform an input source code to intermediate code prior to analyzing the intermediate code; and analyze the intermediate code to identify the candidate loop.

Example 17 includes the program product of any of Examples 14-16, wherein the candidate loop is a loop nest containing one or more additional loops within the candidate loop; and wherein the program instructions are further configured to cause the at least one programmable processor to analyze each additional loop within the candidate loop without permitting early exit from the candidate loop to identify the candidate conditional statement.

Example 18 includes the program product of any of Examples 14-17, wherein the candidate conditional statement includes at least one loop-invariant variable in addition to the at least one mutable variable.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A computer-implemented method of reducing loop branches comprising:
   analyzing an intermediate code corresponding to source code to be compiled to identify a candidate loop based at least in part on the loop including, within the loop, at least one candidate conditional statement, wherein the candidate conditional statement contains at least one mutable operand;
   analyzing a portion of the intermediate code to determine if a computation, which computes respective values of the mutable operand in the candidate conditional statement in iterations of the loop, is monotonic;
   in response to determining that the computation in the candidate conditional statement is monotonic, calculating an initial value of the mutable operand and a final value of the mutable operand;
   generating a first version of the candidate loop which does not contain the candidate conditional statement and which is configured to be executed if the initial value of the mutable operand and the final value of the mutable operand satisfy a range check; and
   generating a second version of the candidate loop which contains the candidate conditional statement and which is configured to be executed if at least one of the initial value of the mutable operand or the final value of the mutable operand does not satisfy the range check.

2. The method of claim 1, wherein the computation in the candidate conditional statement includes the range check.

3. The method of claim 1, further comprising transforming the source code to the intermediate code prior to analyzing the intermediate code.

4. The method of claim 1, wherein the candidate loop is a loop nest containing one or more additional loops within the candidate loop; and
   wherein analyzing the candidate loop comprises analyzing each additional loop within the candidate loop without permitting early exit from the candidate loop.

5. The method of claim 1, wherein the candidate conditional statement includes at least one loop-invariant variable in addition to the at least one mutable operand.

6. A computer system comprising:
   an interface configured to receive input source code; and
   a processor coupled to the interface and configured to compile the input source code;
   wherein the processor is further configured to modify a loop in the source code having a conditional statement within the loop, the conditional statement configured to operate on at least one mutable variable;
   wherein the processor is further configured to modify the loop in the source code based on analyzing an intermediate code corresponding to the input source code and determining that a portion of the intermediate code, within the loop, includes a computation in the conditional statement computes respective values of the mutable variable in iterations of the loop deterministically and monotonically;
   wherein, to modify the loop, the processor is configured to move the conditional statement outside of the loop to generate a first version of the loop which is configured to be executed if an initial value of the at least one mutable variable and a final value of the at least one mutable variable each satisfy a boundary condition check; and
   wherein the processor is further configured to generate a second version of the loop containing the conditional statement within the second version of the loop, the second version of the loop configured to be executed if either the initial value of the at least one mutable variable or the final value of the at least one mutable variable does not satisfy the boundary check condition.

7. The computer system of claim 6, wherein the processor is further configured to
   generate the first and second versions of the loop in response to determining that the computation in the conditional statement computes the respective values of the mutable variable in iterations of the loop deterministically and monotonically.

8. The computer system of claim 7, wherein the processor is further configured to transform the source code to the intermediate code prior to analyzing the intermediate code.

9. The computer system of claim 7, wherein the loop is a loop nest containing one or more additional loops within the loop; and
  wherein the processor is configured to analyze each additional loop within the loop without permitting early exit from the loop to identify the conditional statement configured to operate on at least one mutable variable.

10. The computer system of claim 6, wherein the interface is one of a network interface or an input/output interface.

11. The computer system of claim 6, wherein the conditional statement includes a boundary condition check computation.

12. The computer system of claim 6, wherein the processor is configured to implement one of a just-in-time compiler and an ahead-of-time compiler.

13. The computer system of claim 6, wherein the conditional statement includes at least one loop-invariant variable in addition to the at least one mutable variable.

14. A program product comprising a processor-readable storage medium having program instructions embodied thereon, wherein the program instructions are configured, when executed by at least one programmable processor, to cause the at least one programmable processor to:
  identify a candidate loop based at least in part on the loop including, within the loop, at least one candidate conditional statement, wherein the candidate conditional statement contains at least one mutable variable;
  analyze a computation of the candidate conditional statement which computes respective values of the mutable variable in iterations of the loop to determine if the computation in the candidate conditional statement is deterministic and monotonic;
  calculate an initial value of the mutable operand and a final value of the mutable operand in response to determining that the computation in the candidate conditional statement is deterministic and monotonic;
  generate a first version of the candidate loop which does not contain the candidate conditional statement and which is configured to be executed if the initial value of the mutable variable and the final value of the mutable variable satisfy a boundary condition check; and
  generate a second version of the candidate loop which contains the candidate conditional statement and which is configured to be executed if at least one of the initial value of the mutable variable or the final value of the mutable variable does not satisfy the boundary condition check.

15. The program product of claim 14, wherein the computation in the candidate conditional statement includes the boundary condition check.

16. The program product of claim 14, wherein the program instructions are further configured to cause the at least one programmable processor to:
  transform an input source code to intermediate code prior to analyzing the intermediate code; and
  analyze the intermediate code to identify the candidate loop.

17. The program product of claim 14, wherein the candidate loop is a loop nest containing one or more additional loops within the candidate loop; and
  wherein the program instructions are further configured to cause the at least one programmable processor to analyze each additional loop within the candidate loop without permitting early exit from the candidate loop to identify the candidate conditional statement.

18. The program product of claim 14, wherein the candidate conditional statement includes at least one loop-invariant variable in addition to the at least one mutable variable.

* * * * *